Aug. 5, 1947.   C. D. PETERSON ET AL   2,425,203
SYNCHRONIZING CLUTCH
Filed Oct. 17, 1944
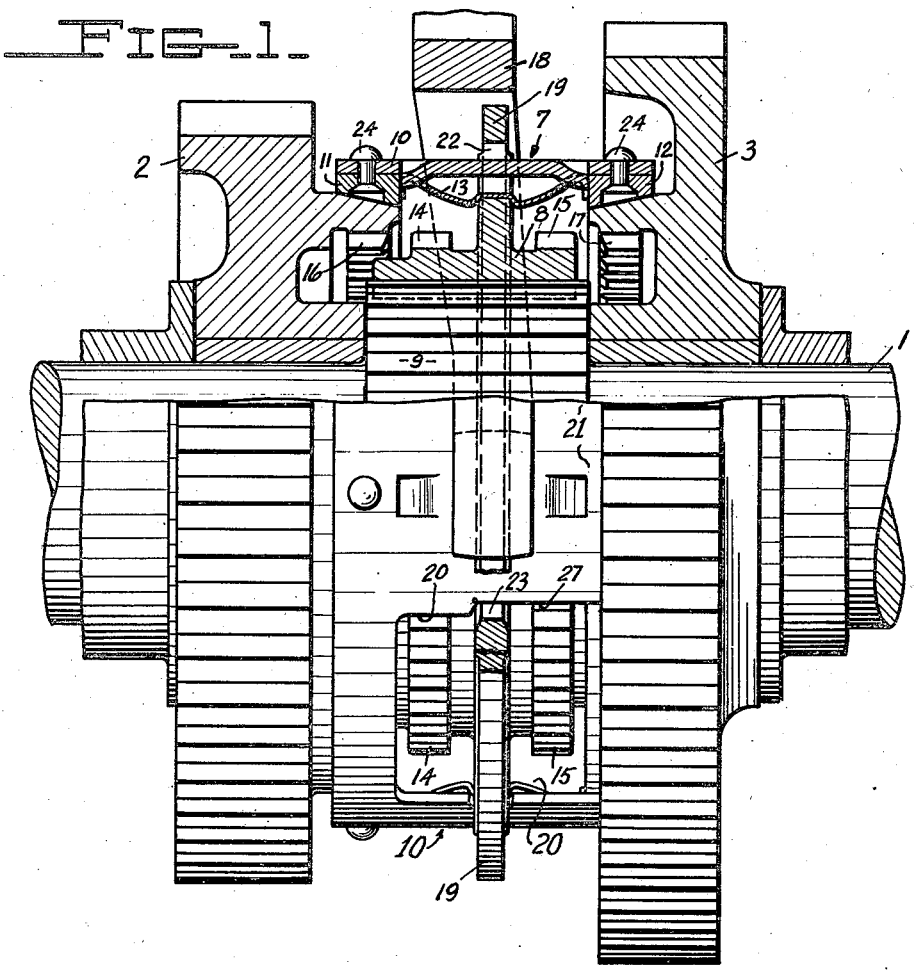
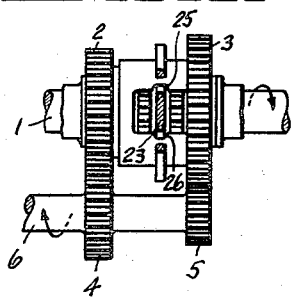
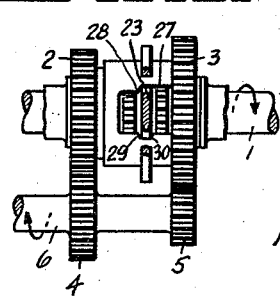
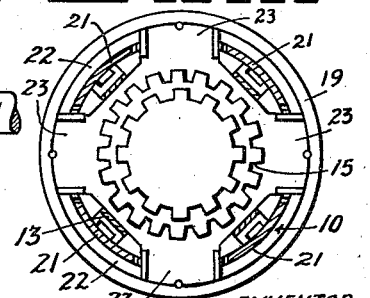
INVENTOR
Carl D. Peterson &
Robert R. Burkhalter,
BY Bodell & Thompson
ATTORNEYS.

Patented Aug. 5, 1947

2,425,203

UNITED STATES PATENT OFFICE 2,425,203

SYNCHRONIZING CLUTCH

Carl D. Peterson and Robert R. Burkhalter, Toledo, Ohio; Marion F. Peterson, executrix of Carl D. Peterson, deceased, assignors to Dana Corporation, Toledo, Ohio, a corporation of Virginia Application October 17, 1944, Serial No. 558,986

1 Claim. (Cl. 74—339)

This invention relates to synchronizing clutches, such as are used in transmission gearings for motor vehicles, which clutches are shiftable in opposite directions from neutral into two different speed ratios or drives and embody a toothed element and a friction element, the toothed element having clutch teeth at opposite ends thereof and the friction element having friction faces on opposite ends thereof, the toothed and friction faces at like ends of the clutch coacting with complemental faces on a member or gear in one gear ratio and the toothed and friction faces at the other end, coacting with complemental faces on a member in another gear ratio, the clutch elements being shiftable as a unit in one direction or the other from neutral by shifting force applied to the toothed element, until the friction face of the friction element at one end or the other engages with the complemental friction face, and the toothed element being shiftable axially relatively to the friction element when shifting-in force continues to be applied, to bring the toothed faces into engagement of the two parts to be clutched together, the friction element having a limited arcuate rocking movement relatively to the toothed element, and these two elements being provided with blocking shoulders or teeth which normally engage until the speeds of the two parts to be clutched together synchronize.

The invention consists in a blocking shoulder or blocking tooth arrangement, whereby blocking takes place only when a shift is being made from lower speed into a higher speed drive and also if desired from the higher gear ratio into a low gear drive when the vehicle is in motion, and a member in the gear train rotating, whereby blocking does not take place when a shift is being made into the lower gear drive when the vehicle is stationary or the member in the lower gear drive is not rotating, the lower gear drive being the starting train gear.

The invention consists in the novel features and in the combinations and constructions hereinafter set forth and claimed.

In describing this invention, reference is had to the accompanying drawings, in which like characters designate corresponding parts in all the views.

Figure 1 is a fragmentary elevation, partly in section, of a gearing embodying this clutch.

Figure 2 is a view on a reduced scale showing the general arrangement of the blocking shoulders in clutches heretofore used, that is, where shifting in of the toothed member is blocked until the speeds synchronize, when a shift is being made from a lower speed into a higher gear drive or from the higher gear drive into the lower gear drive, and also when a shift is made from neutral into a lower or starting gear, and the vehicle is stationary or the gears in the lower gear drive not rotating, as when the engine clutch is disengaged.

Figure 3 is a view similar to Figure 2 illustrating one arrangement of the blocking shoulders or teeth wherein a shift is made without blocking, from neutral into the lower or starting gear train, when the vehicle is stationary, or the lower gear train not rotating.

Figure 4 is an end elevation, partly in section, of the friction and jaw members of the clutch, the tongues of the friction member and the springs acting on the same being shown in section.

1 designates the transmission or driven shaft of a gearing. 2 and 3 designate members, as gears, of two different trains of gears, which, when selectively clutched to the shaft 1, drive the shaft at different speeds, the gear 2 driving the shaft at a higher gear ratio than the gear 3. The gear 3 is usually in the low or starting train of gears. The gears 2 and 3 mesh respectively with gears 4 and 5 on a countershaft 6, which is actuated from the drive shaft, not shown.

7 designates the clutch, the clutch here illustrated being a synchronizing clutch, and including a toothed member or slider 8 rotatable with the shaft 1 and splined thereto or to a collar 9 on the shaft 1, and a friction element or ring 10 here shown as in the form of a sleeve mounted on the element 9 to have a limited arcuate rocking movement, this ring or sleeve 10 having friction faces 11, 12 at its opposite ends for coacting respectively with complemental friction faces on the members or gears 2, 3, respectively. The clutch elements 8 and 10 are coupled together by yielding means, as one or more springs 13, which normally cause them to shift as a unit in either direction from neutral, until one or the other of the friction faces 11 or 12 engages the complemental face on the members or gears 2, 3, and further shifting of the member 8, when the shifting-in force continues to be applied thereto, shifts a toothed face 14 or 15 on one end or the other of the element 8 into engagement with complemental clutch face 16 or 17 on the member 2 or 3. The shifting force is applied to the member 8 by a suitable yoke or fork 18 coacting with an annular flange 19 on the element 8 between the ends thereof. The friction element 10 is provided with one or more slots 20 providing prongs 21 which extend through slots 22 in the flange 19, the portions of the flange 19 between the ends of the slots 22 providing shoulders or spokes 23.

In the illustrated embodiment of the invention, this friction member is formed up or rolled up into cylindrical form from sheet metal, and the slots 20 open through one end only thereof, and terminate short of the other end. Rings 10 provided with friction faces 11 and 12 are then secured to the ends of the sleeve, as by rivets 24, the ring at one end closing the open ends of the slots. The specific construction forms no part of this invention.

This invention relates to the arrangement of the shoulders for blocking the shifting in of the toothed element until the speeds of the two parts to be clutched together synchronize, except when the shift is being made into a starting gear from a higher gear or neutral. As the invention is shown as embodied in a synchronizing clutch in which the friction element is usually a sleeve, these blocking shoulders are provided on opposite sides of each slot 20 by widening the slots at their intermediate portions. The shoulders on the sleeve coact with shoulders at the ends of the web or spokes 23. The normal width of the slots is such that the shoulders or spokes 23 fit them with a sliding fit and the widened portions are wide enough to permit the limited arcuate movement of the friction element 7 to bring the blocking shoulders into action when the speeds are different.

In Figure 2, the conventional arrangement of such slots is shown in which the blocking shoulders are formed by the end walls of the notches 25 and 26 on opposite side walls of each slot, these shoulders blocking shifting to a great extent, when a shift is being made into a higher ratio and into a lower ratio, until the speeds of the two parts to be clutched together synchronize.

As seen in Figures 1 and 3, the widened portion 27 extends the full length of the slot 20 toward the right hand end, or in a direction to which the shift is made into a low speed or starting gear ratio, so that a shoulder is provided at 28 on one end of the widened portion, that is, the left hand end, to block shifting to the left into the higher gear but not to block shifting from neutral into the lower gear or to engage the clutch teeth 15 and 17, this shift being effected only when the vehicle is at a stand-still, and only when the gear 3 is stationary or non-rotating, as when the engine is declutched. Also, in Figure 3, the notch on the opposite side, that is, the lower side of the notch (Figure 3) is usually as shown in Figure 2 to block an up-shift into the higher gear and a down-shift from the higher gear to a lower gear. Thus, this notch provides shoulders 29, 30. When the shift is being made into the lower gear from the higher, and hence the lower gear 3 is rotating, the synchronizing ring or sleeve in its rocking movement takes the position in which the shoulder 23 or the lower edges thereof is in the notch between the shoulders 29, 30, so that the speeds must be synchronized before a shift can be made to carry the clutch teeth 15 into engagement with the clutch teeth 17 of the gear 3, when this gear is rotating. Such a shift would be made by a double de-clutching operation of the engine clutch and accelerating the engine, when in neutral with clutch re-engaged to speed up the countershaft and the gear 3, this being usually a quick emergency shift when the situation requires the use of the engine as a brake. The arrangement shown in Figure 3 prevents such a shift until the speeds of the shaft 1 and the gear 3 synchronize. The main purpose of not blocking when shifting into first or starting gear is to prevent the liability of sticking on abutting blocking shoulders when shifting from rest into first or starting gear. When the vehicle is at rest and the engine running, the gear trains stop and a shift to first is liable to result in the shift to low or first gear being blocked because the synchronizing sleeve has rocked to set in blocking position, and there is no means to unlock it or reverse its rocking movement to unblocking position.

By this arrangement of blocking shoulders, the shift into the lower gear drive, particularly when it is at a stand-still is easily made.

What we claim is:

In a synchronizing clutch for automotive transmission gears which include a transmission or output shaft, a countershaft, gears on the output shaft and spaced axially thereon and normally rotatable about the output shaft, and drive gears for the former gears on the counter shaft and meshing with the former gears respectively, the intermeshing gears providing gear trains of different ratios, one of which is the starting gear when the vehicle is stationary, the synchronizing clutch being located between the former gears and including a toothed element rotatable with the output shaft, and a synchronizing friction element rotatable with the toothed element and having a rocking arcuate movement relatively thereto and shiftable into position midway between the ends of its arcuate movement when the speeds of the two parts to be clutched together synchronize, said elements being shiftable as a unit in either direction from neutral until the friction element engages and the toothed element being then shiftable axially into clutching engagement relatively to the friction element; said elements having blocking means located to coact and block relative shifting movement from neutral into the higher gear drive and to block relative movement when the shift is made into the starting gear ratio only when the vehicle is in motion.

CARL D. PETERSON.
ROBERT R. BURKHALTER.

REFERENCES CITED

The following references are of record in the file of this patent:

UNITED STATES PATENTS

| Number | Name | Date |
| --- | --- | --- |
| 2,019,073 | Cooper et al. | Oct. 29, 1935 |
| 2,175,911 | Peterson | Oct. 10, 1939 |
| 2,245,816 | Peterson | June 17, 1941 |
| 2,369,843 | Neracher et al. | Feb. 20, 1945 |